United States Patent [19]
Girardi

[11] 3,785,509
[45] Jan. 15, 1974

[54] TRANSFER DEVICE
[75] Inventor: Vincent J. Girardi, Grosse Point Wood, Mich.
[73] Assignee: The Babcock & Wilcox Company, New York, N.Y.
[22] Filed: Aug. 17, 1971
[21] Appl. No.: 172,382

[52] U.S. Cl............... 214/8.5 H, 198/210, 221/266
[51] Int. Cl............................................. B65g 59/06
[58] Field of Search .................. 214/1.1, 1.5, 1 P, 214/8.5 R, 8.5 H, 8.5 K; 221/266; 198/210

[56] References Cited
UNITED STATES PATENTS
2,743,001  4/1956  Nordquist .................. 221/266 X
3,537,580  11/1970  Beroset ..................... 221/266 X
2,202,762  5/1940  Freed ....................... 198/210 X
2,546,504  3/1951  Head ....................... 198/210 X FOREIGN PATENTS OR APPLICATIONS
354,530  8/1931  Great Britain ................. 198/210

Primary Examiner—Gerald M. Forlenza
Assistant Examiner—George F. Abraham
Attorney—J. Maguire

[57] ABSTRACT

A transfer device for use in taking fixtures or workpieces from a hopper and placing them in a transverse position for receptive engagement by a holding device moving along a longitudinal path through a broaching machine.

3 Claims, 6 Drawing Figures

PATENTED JAN 15 1974  3,785,509

INVENTOR.

BY

ATTORNEY

PATENTED JAN 15 1974

TRANSFER DEVICE

This invention relates to a device for use in the provision of workpieces in an operative fashion to engagement means for longitudinal travel through a broaching machine.

More particularly, this invention relates to a device for use in transferring workpieces from a supply hopper of the transverse variety to engagement means affixed to movable longitudinal path-defining means for travel through a broaching machine in an effective and efficient manner for the attainment of the optimum in productivity of broached workpieces.

In the conventional broaching machine, there usually is provision for passage of a conveying system therethrough consisting of two parallel endless driving chains supported by a pair of rigidly connected sprockets wheels, one of which communicates with a driving mechanism. Affixed between the parallel chains are usually a series of engagement devices in spaced relation for use in securing the fixture or workpiece in a properly oriented position for contact with at least one or more tooling devices upon travel through such machine for broaching or other metal working of a very fine and detailed nature.

In the past, there have been many efforts to load fixture or workpieces in the engagement means of such system in an effective and efficient manner prior to travel through a broaching machine. Initially, an attempt was made to load the engagement means or holding device with such fixtures in a manual fashion. In a continuous broaching process, as should be apparent, the workpieces are loaded into a succession of holding devices of the engagement variety as the latter continually pass the loading station in spaced relation to one another. After travel through the broaching machine, the finished product of this process is automatically discharged at the exit end of the machine. As described, the manual process of loading necessarily places a limit on the attainable rate of production. In other words, the speed of motion of the holding device or engagement means must be of a relatively low or slow nature in order to permit the loading of the workpieces into the holder in a properly oriented manner within the range of manual access to such holder. Also, in the past, such holder were in many cases provided with manually actuated engagement means which inherently required a further reduction in the speed of the supply train or conveying means.

Further on in time, loading was accomplished by thrusting the workpiece into a holding device having an automatic engagement means as such device moved to the broaching machine. In such a case, the force of the thrust was perpendicular to the line of motion of the holding device. However, it was found that, in many cases, the force of the thrust would disorient the blank or workpiece relative to the engagement means or holder and the workpiece would jam the broaching machine which would at least require reorientation of the piece, repair of the holder, or in extreme cases, even disassembly of a section of the machine itself.

Also efforts have been made to provide magazine type feeding devices for delivering workpieces to the engagement means of a holder such as the one heretofore described. However, these efforts have not been successful without the addition of novel transfer devices between a conventional magazine and the engagement means of the holder which itself is moving towards the broaching machine. Problems arise with even simple workpieces and become more severe for the production staff even when odd shaped pieces are to be machined.

There have been some successful designs but all have been very complex to build, maintain and use. For instance, one of such designs consisted of a linerally moving shuttle. The latter device would start from rest in receptive alignment with a magazine or supply hopper at which point it would receive a blank workpiece. Then, in sequence, the device would be accelerated by driving means in a path parallel to the holder until the velocity of the shuttle and holder were equal and transfer of the blank workpiece would then be made to the engagement means of the holder. After this was accomplished, the shuttle would linearly return to its position under the magazine for receipt of another blank workpiece while the workpiece initially provided to the holder would proceed to the broaching machine. The latter described system is somewhat successful but is rather cumbersome, complex and expensive to build, maintain, and repair.

What is needed in the art is a transfer device of simple inexpensive construction having facile in use under a wide variety of service conditions which will effectively and efficiently transfer blank workpieces from a supply hopper to a receptive holder of a broaching machine having engagement means for the proper orientation of such blank for detailed metal working of a broaching nature and the like.

The subject invention answers the needs of the art with special emphasis on a device for use in the receptive engagement of a blank workpiece from a supply hopper and the subsequent transfer of such blank to a position for receptive engagement by a holding device moving along a longitudinal path transverse such hopper to a metal working machine such as a broacher and the like.

It is an object of this invention to provide a novel device intermediate a supply hopper and a conveying means for use in transferring blank workpieces therebetween in proper orientation for metal working by a broaching machine.

Another object of this invention is to provide a device of novel construction for use in transferring a blank workpiece in proper orientation from a supply hopper to the engagement means of a holder moving along a longitudinal path towards a broaching machine.

A further object is to provide a device for use in the receptive engagement and subsequent transfer of a workpiece in proper orientation from a supply hopper of the magazine variety to position where it is receptively engaged by a holder moving on a conveying system to a longitudinal broaching machine.

Other objects and many of the attendant advantages of this invention will become readily apparent to one skilled in the art in view of the following detailed description and accompanying drawings, wherein.

Similar numerals refer to similar parts throughout the several views.

Figure 2:
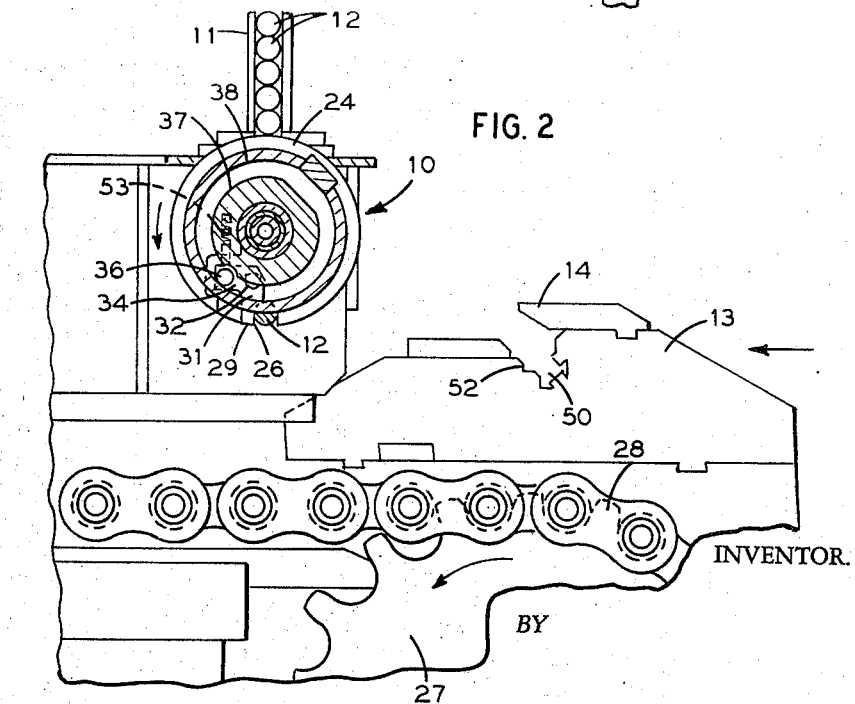
FIG. 2 is a section taken on line 2—2 of FIG. 1 showing the device of this invention in position for receptive engagement of the workpiece by a holder.

The subject device of this invention is provided with supports 16 and 17, in spaced relation to one another, having bushings 18 and 19 in axial alignment for the receptive rotatable engagement of shafts 21 and 22 both of which extend in a longitudinal fashion from cylindrical hub 23. A disk is mounted on each end portion of said hub. These disks 24 and 25 are circular in nature as shown in FIG. 2 and each of their peripheries is provided with a semi-circular groove 26 in axial alignment with one another. The latter grooves 26 are both adapted for receptive engagement of said blank workpieces 12 from said supply hopper 11 and transfer of said workpieces 12 in sequence to a position for receptive engagement by the engagement means 14 of holder 13 as the latter is driven along a longitudinal path as indicated in FIG. 2.

Referring again to FIG. 2, the holder 13 is driven in a linear fashion by a motive force (not shown) communicating with a sprocket wheel 27 through endless chain 28 shown in section.

Figure 1:
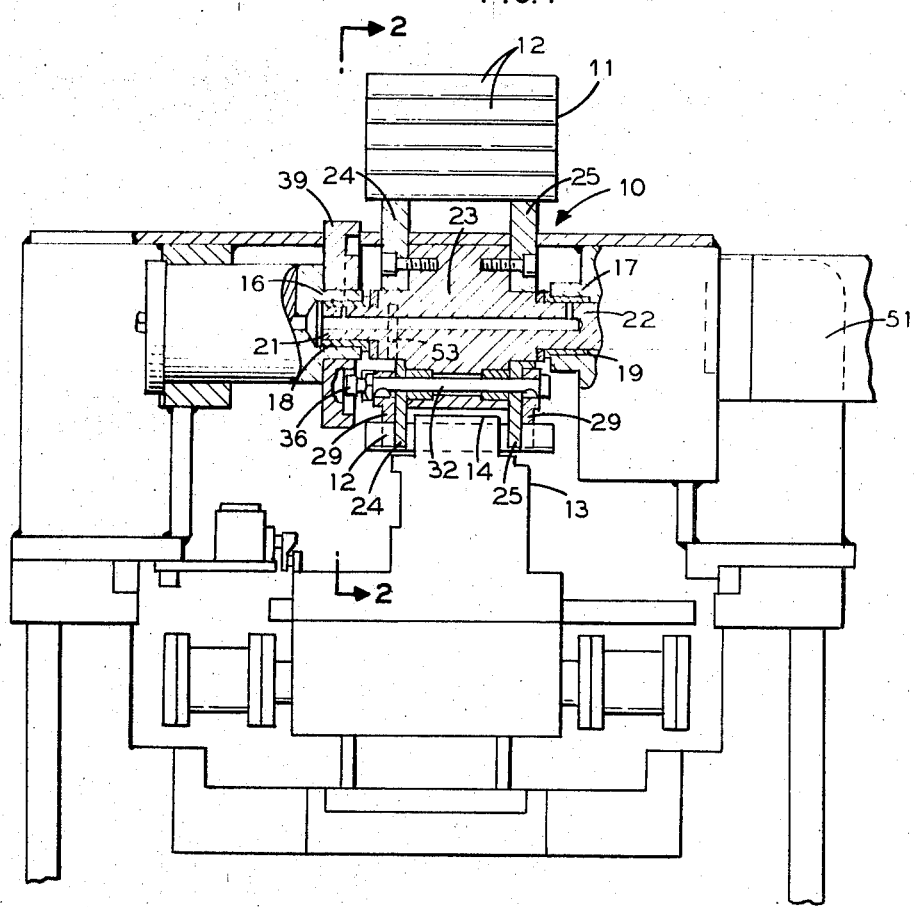
FIG. 1 is a view in section of the device of this invention in operative position relative to the front or receptive end of a broaching machine.

Referring now to FIG. 1 and 2, it may be seen that the blank workpiece 12 is in a receptive position for engagement by means 14 of the finger variety. The workpiece is held in this position in each groove 26 by the pressing action of one arm 29 of a bifurcated lever 31 attached in bell crank relation to either end of shaft 32. The latter longitudinal shaft 32 passes laterally through disks 24, 25 and is axially movable therein. One arm 34 of the bifurcated lever 31 is provided with a follower 36 which traces a path between surfaces 37, 38 of camming unit 39 affixed in operative fashion to support 16.

Figure 3:
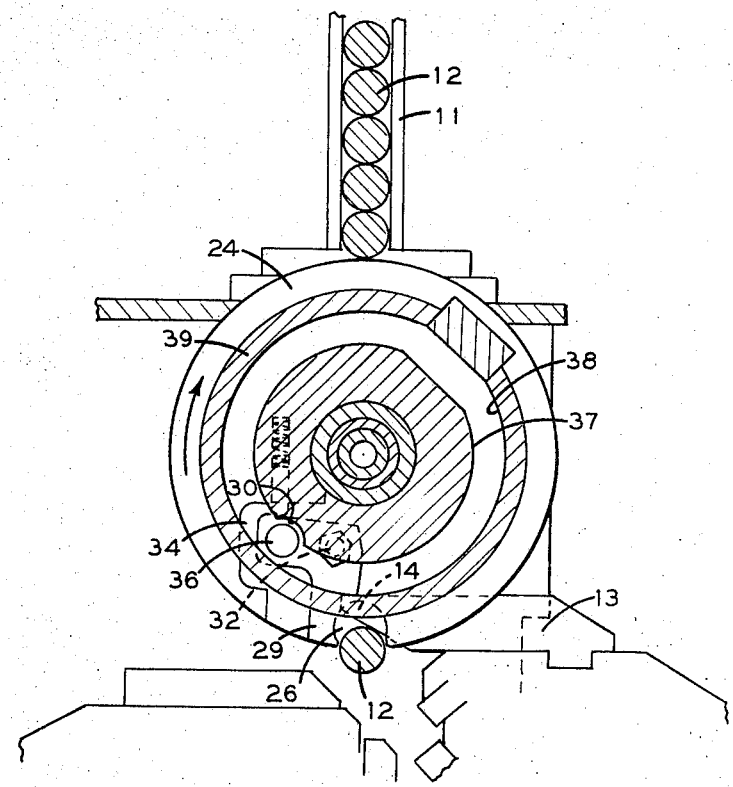
FIG. 3 is a sectional view of the device showing receptive engagement of the workpiece by the holder.
Figure 4:
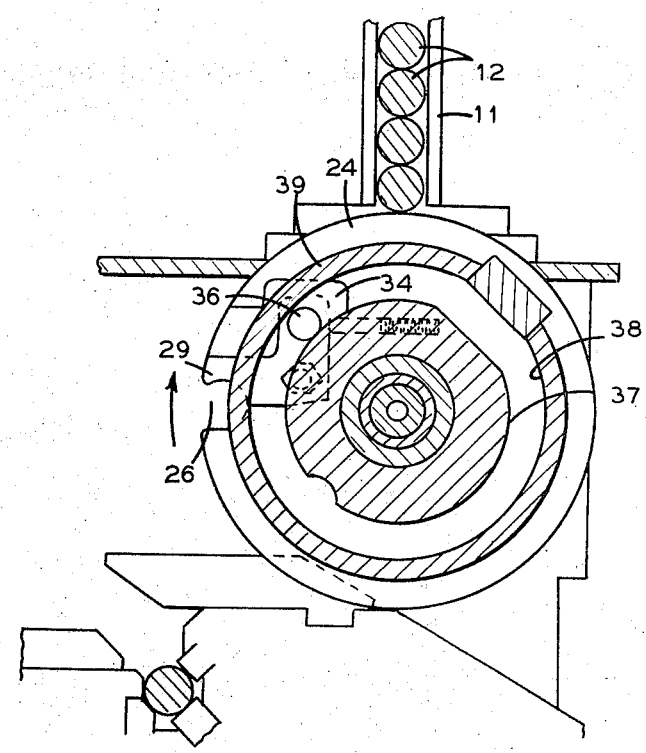
Figure 5:
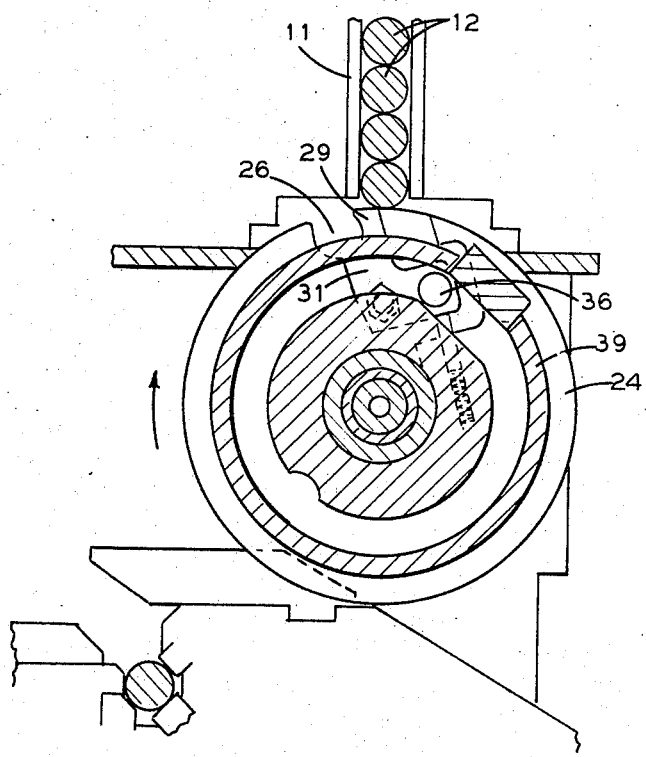

FIG. 3 shows the sequential movement of holder 13 and the disengagement of workpiece 12 from groove 26 by finger means 14 and, as indicated by the arrow, the movement of follower 36 between surface 37 and 38 of fixed camming structure 39 to the sequential positions of FIGS. 4 and 5. As shown in FIG. 3, the surface 37 of the camming structure 39 is provided with a peripheral groove 30 which allows clockwise movement to follower 36 and facilitates the reduction of the pression action of arm 29 on workpiece 12 when the latter is engaged by finger 14.

FIGS. 4 and 5 indicate the reduction of the mouth of groove 26 by arm 29 as the latter groove proceeds in a clockwise direction in accordance with the semi-circular revolution of disk 39 upon its axis from the position shown in FIG. 3. The described closing action of arm 29 is the result of the follower 36 proceeding in the semi-circular path defined by surfaces 37 and 38 of the fixed camming structure 39. However as the follower 36 enters into linear channel formed by the flattened area of surfaces 37 and 39, the arm 29 of the bifurcated lever 31 moves in a clockwise direction resulting in the widening of the mouth of the groove 26 and the gravitational receipt of a new workpiece 12 from hopper 11 as indicated in FIG. 6.

Figure 6:
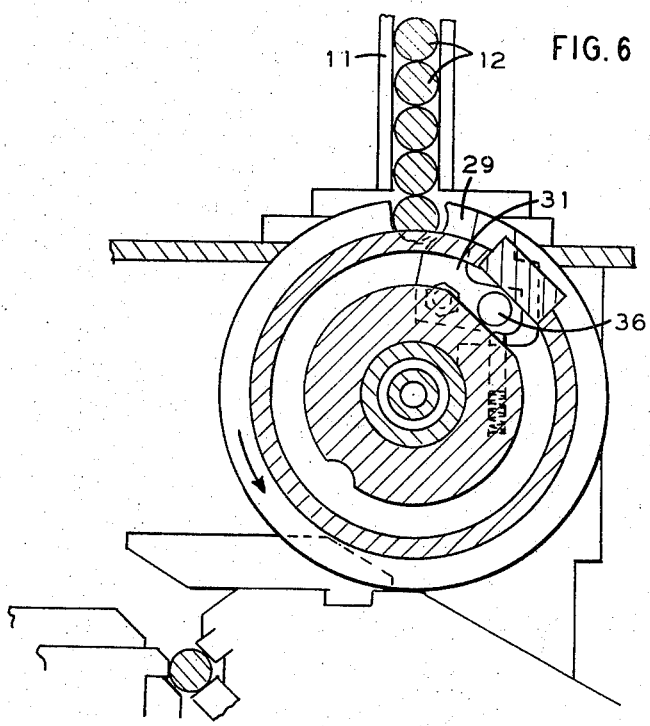
FIGS. 4 to 6 are views in sequence showing the relative movement of the device after receptive engagement of the workpiece by the holder.

After receipt of a blank workpiece 12, the disk 24 rotates in a counter-clockwise direction and the follower 36 proceeds out of the linear channel into the adjacent annular channel formed by surfaces 37 and 38 as shown in FIGS. 6 to the position shown in FIG. 2.

The fixed camming structure 39, which is preferably utilized in this invention as heretofore described is provided with a path defined by surfaces 37 and 38 for the directional control of follower 36 and the actuation of arm 29 into the sequential phases heretofore described. Such a channel or path is provided with an annular area and a linear area. The fixed cam 39 may be easily described by analogy to a clock wherein the inner surface 37 has a peripheral groove, the extremities of the mouth thereof extending between 0700 to 0800 o'clock relative to hopper 11 as shown in FIGS. 2 to 6. Further, the linear area of the path defined by the flattened span of surfaces 37 and 38 extends between 1300 and 1400 o'clock relative to hopper 11. In both of the above analogies, the hopper is positioned at 1200 o'clock high.

As shown in FIGS. 2 to 6, the holder 13 is provided with a blank receiving nest 50 and a clamping jaw 52 which make up the engagement means for the nested workpiece. The finger 14 of the holder 13 may be also known as a stripping cam surface. Also, as shown in each of these figures, the bifurcated lever is spring loaded. For instance, as shown, the arm 34 is acted upon by a combination plunger and spring 53. Extensional force of the latter combination tends to rotate arms 29 about the axis of shaft 32 and, in this manner, maintain a clamping force in the workpiece 12 prior to engagement of the same by finger 14 of the holder.

In operation, as the workpiece 12 leaves the grooves 26, the arms 29 are forced back against the spring plunger 53. The combined forcing by finger 14 and the spring resisted release by the arms 29 results in a controlled drop of the workpiece 12 into the clamping nest 50 in the workpiece holder 13. When the workpiece has left the groove 26, the arms 29 are forced back to a clamping position by spring plunger 53. At this time, there is no blank workpiece in the groove 26 but the extent of the return of the spaced apart arms 29 is limited by the follower 36 engaging surface 38. Further, the clamp jaw 52 moves by conventional means and secures the workpiece 12 in place for broaching.

The shaft 22 communicates in operative fashion with motive means 51. The latter may be any one of known types of devices such as electro-mechanical, hydro-mechanical or even pneumo-mechanical. In any case, in the preferred embodiment, such motive means is adapted to rotate cylindrical hub 23 reciprocally through 180 degrees and back upon command from conventional controls (not shown).

Preferably, the depth of groove 26 is greater than the radius of the workpiece 12 but slightly less than the diameter of the same. When disks 24 and 25 move in a counterclockwise direction after loading, the arms 29 will positively move the workpiece 12 from its position in the hopper or magazine stock 12. At the same time, the peripheral surface of both such disks will move under the next lowest blank workpiece awaiting transit. All of the latter blanks need not be totally cylindrical but may be hexagonal or even octagonal for the process as heretofore described to be operative. However, in the case of square or rectangular workpieces, the process would be operative with only slight modification of the receptive disks.

The proper time relationship between the reception of the workpiece by the device and the subsequent rotation may be accomplished by many means known in the art. For instance, cam action may be used or even an electrical switch may be actuated by any one of the several positions of the cylindrical hub of the device. All of the latter means are conventionally known in the art.

For higher production rates, the disks of the device of this invention may be provided with a plurality of grooves each of which on one disk is in axial alignment with a groove on the other disk. Thus, providing two or more holding locations on the loader. Such a plurality of positions would be in peripheral spaced relationship on both of the disks. In this manner the device would be holding one piece for pickup by the engagement means of the holder while at the same time receiving a new piece from the magazine. As in the latter described versin, motion of the loading device would be controlled by the movement of the holder 13 along its longitudinal path. In this connection, however, the successive rotation of the transfer device would be unidirectional rather than reciprocal.

What is claimed is:

1. In a broaching machine having a fixture holding device adapted for movement along a longitudinal path into a broaching machine and a hopper having a supply of said fixtures spaced from the broaching machine, the improvement of a device for use in transferring said fixtures from said hopper to said fixture holding device, comprising dual supports in spaced apart relation, each of said supports having receptive bushings; a hub mounted between said supports, said hub having extensional shafts each of which is rotatably mounted in one of said bushings; disks mounted in spaced apart relation on said hub, each of said disks having a peripherally receptical in alignment with one another, both of said receptical adapted for receptive engagement of a fixture from said hopper; cam actuated mechanical means for holding a fixture in said receptical; means for providing rotary motion to said hub in order to place said latter fixture in position for engagement by said fixture holding device, and means associated with the fixture holding device for releasing the fixture from said receptical, and securing the fixture in the fixture holding device.

2. The device of claim 1 wherein said means for securing said fixture in said receptical, comprising: a longitudinal shaft passing laterally through both of said disks, dual lever, each of which is provided with two arms secured in bell crank relationship to the shaft which upon actuation reduce the mouth of said receptical.

3. The device of claim 2 wherein both said levers are actuated by a follower provided on one arm of one of said levers,
said follower riding a path defined by a fixed camming
surface secured to one of said supports.

* * * * *